Oct. 30, 1928.
R. A. ASHTON
1,689,711
MULTIPLE TOOL SLIDE FOR MACHINE TOOLS
Filed March 18, 1926　　2 Sheets-Sheet 1
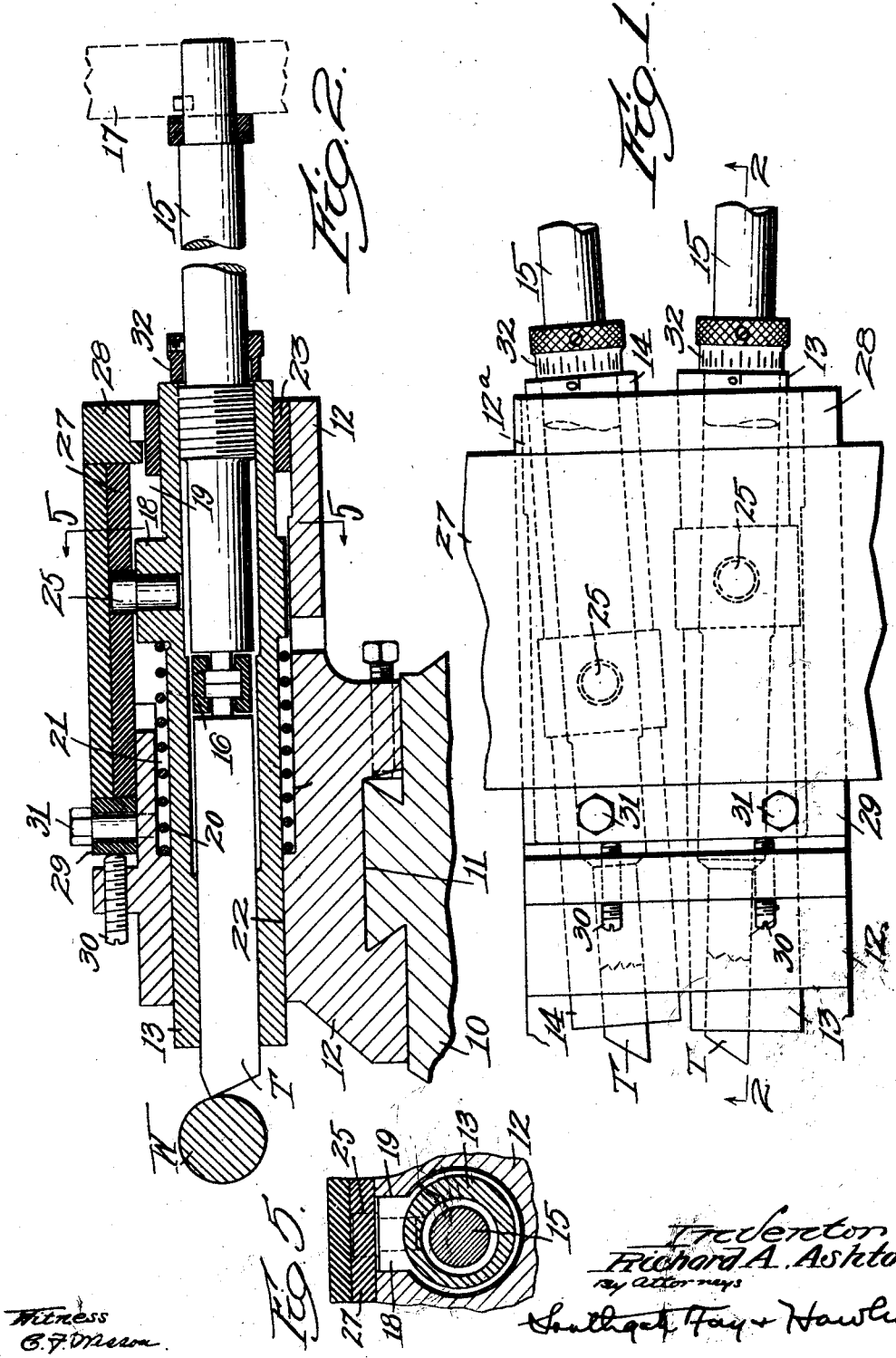

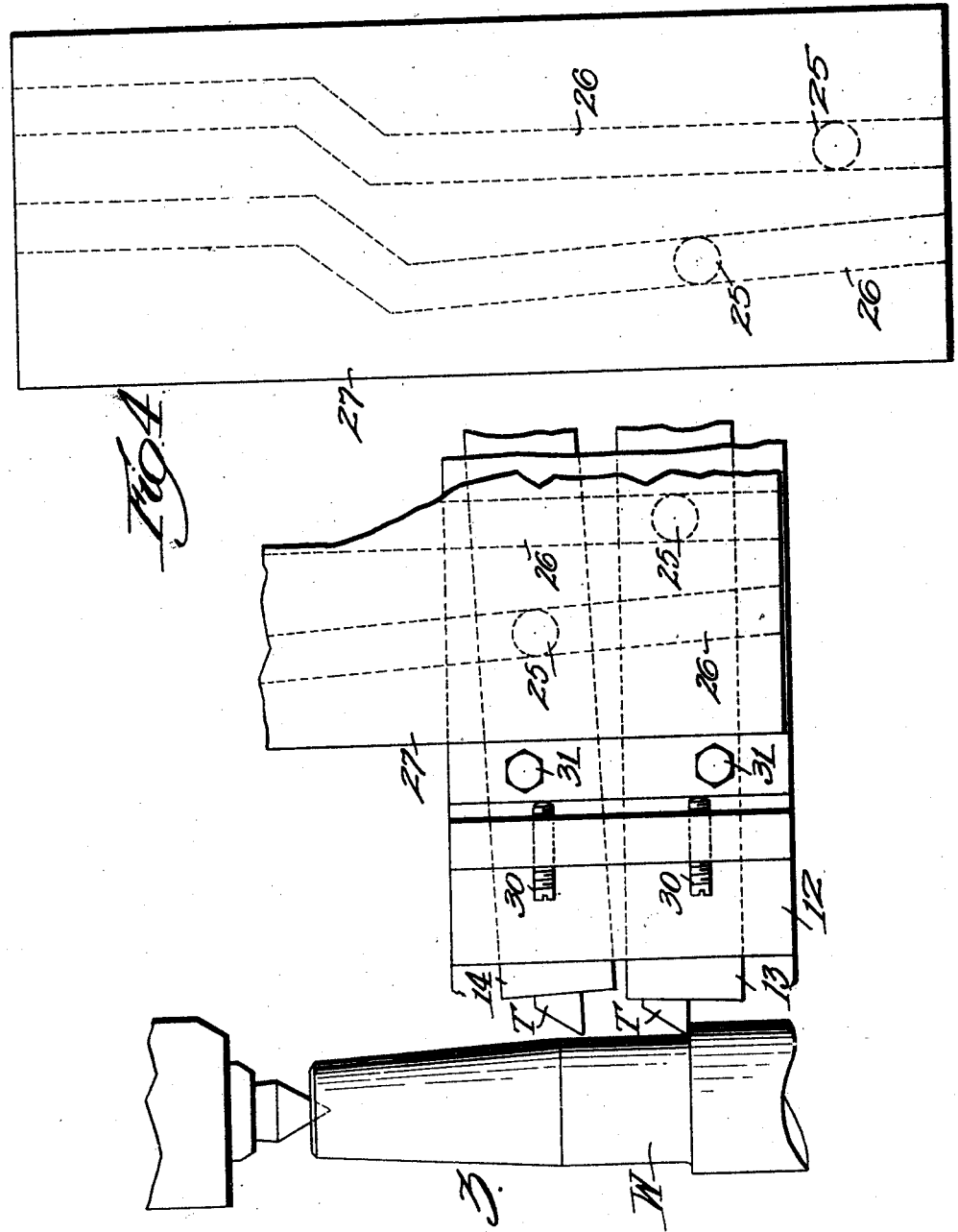

Patented Oct. 30, 1928.

1,689,711

UNITED STATES PATENT OFFICE.

RICHARD A. ASHTON, OF SENECA FALLS, NEW YORK, ASSIGNOR TO SENECA FALLS MACHINE CO., OF SENECA FALLS, NEW YORK, A CORPORATION OF MASSACHUSETTS.

MULTIPLE TOOL SLIDE FOR MACHINE TOOLS.

Application filed March 18, 1926. Serial No. 95,780.

This invention relates to a machine tool in which a plurality of turning or cutting tools are used and in which cam means is provided for moving the tools towards or from the work.

It is the object of my invention to provide means by which closely adjacent tools may be separately advanced or retracted and preferably by which they may be moved in nonparallel paths.

The preferred form of my invention contemplates the provision of a templet bar or plate having a plurality of cam grooves therein, preferably located in the same plane, and in combination with cam followers so positioned on the tool slides that they will cooperate with the different cam grooves.

By this construction the tools may each receive any desired movement toward or from the work and in any timed relation.

My invention further relates to arrangements and combinations of parts which will be hereinafter described and more particularly pointed out in the appended claims.

A preferred form of my invention is shown in the drawings, in which

Fig. 1 is a plan view of a portion of a multiple lathe or other machine tool, embodying my invention;

Fig. 2 is a sectional elevation, taken along the line 2—2 in Fig. 1;

Fig. 3 is an enlarged plan view of certain of the parts shown in Fig. 1;

Fig. 4 is a plan view of the templet bar or plate; and

Fig. 5 is a detail sectional elevation, taken along the line 5—5 in Fig. 2.

Referring to the drawings, I have shown a portion of a casing or frame 10 having guideways 11 on which a tool carriage 12 is slidable axially of the work W. The tool carriage 12 is provided with a plurality of transversely extended recesses 12ª in which tool slides 13 and 14 are movable towards and from the work. Any suitable cutting or turning tools T are mounted in the tool slides and may be adjusted longitudinally of the tool slides by adjusting screws 15.

Each adjusting screw 15 is threaded into the outer end of the corresponding tool slide and is connected with the tool shank in any suitable manner. In the drawings I have shown the screws 15 and the adjacent tool shanks as provided with headed projections which are secured together by split collars 16 having recesses for the projections. Each collar will prevent relative axial movement of the corresponding tool and screw while permitting angular movement of the screw. A suitable handle 17 is provided for adjusting the positions of the tools in the tool slides.

Each tool slide 13 or 14 has a lug or projection 18 extending through a co-operating elongated slot 19 in the upper portion of the tool carriage 12. Each projection 18 fits closely against the sides of its slot 19, as illustrated in Fig. 5, and thus prevents angular movement of the tool slide.

A compression spring 20 for each slide is fitted in a recess 21 in the tool carriage 12 and acts against a shoulder on the tool slide to yieldingly press the slide rearward away from the work. Bearings 22 and 23 are provided at the ends of the tool slides, and the bearings of different slides may be angularly disposed to bring the tools T more closely together. Furthermore, the opening of the tool T and the adjusting screw 15 may be angularly disposed in the tool slide itself as indicated in slide 13, for still closer positioning of adjacent tools.

A stud or roll 25 is mounted on the projection of each tool slide and co-operate with a cam groove 26 in a templet bar or plate 27 secured to the machine frame and held from axial movement. A bearing member 28 is fixed to the front portion of the tool carriage 12 and forms an abutment for one edge of the templet bar 27. A second bearing member 29 is provided on the tool carriage at the opposite edge of the bar 27 and may be adjusted toward the bar 27 by an adjusting screw 30 after which it may be clamped in adjusted position by a clamping screw 31.

A separate cam groove 26 may be provided for each tool slide 13 and 14 and these cam grooves are usually in nonparallel relation and are preferably disposed in a single plane.

The lugs or projections 18 and the rolls 25 (Fig. 1) on the tool slides are disposed axially of the slides so that different rolls 25 will cooperate with different cam grooves 26. A graduated collar 32 may be clamped on each threaded rod or screw 15 and co-operates with a zero mark on the end of the tool slide to indicate the amount of any slight angular adjustment of the screw 15.

The templet bar is preferably made as shown in upper and lower parts, for convenience in manufacture, the lower part being slotted to provide cam grooves and being firmly supported by the upper part.

Having described the details of construction of my improved multiple tool slide, the method of operation and the advantages thereof will be readily apparent. As the tool carriage is moved axially along the work, each stud or roll 25 co-operates with its corresponding cam groove 26 in the templet bar 27 and moves the associated tool T toward or from the work, such movement being independent for each tool and simultaneous with the movement of the carriage.

The cam grooves being double faced will cause the slides to move both towards and from the work, but the springs 20 are effective to take up any slight back-lash between the parts. The movable bearing 29 is adjusted to cause a close sliding fit between the templet bar or plate 27 and the tool carriage 12. The tools T may operate closely adjacent and may be angularly disposed as shown in Fig. 1, and furthermore, certain of the tools and adjusting screws may be disposed at an angle to the axis of the tool slide for closer operation.

By making the cam grooves 26 wider than the diameter of a cam roll 25, the cams may be made single-acting, the tools being retracted by the springs 20.

Any desired relative movement of the slides may be produced by suitable design of the cam grooves in the templet bar 27, and different movements may be easily produced by removing one templet bar and inserting another bar having different cam grooves.

The entire construction is extremely simple and accurate duplicate work may be produced thereby.

Having described my invention and the advantages thereof, I do not wish to be limited to the details herein disclosed, otherwise than as set forth in the claims, but what I claim is:—

1. In a machine tool, a carriage movable axially of the work, a plurality of tool slides movable transversely in said carriage toward and from the work, a cam plate fixed axially in said machine tool and having a straight bearing surface parallel to the path of movement of said carriage and having a plurality of separate cam grooves extending lengthwise of said plate, said carriage having a bearing member engaging said straight bearing surface, and yielding means to force said cam plate against said bearing member, said tool slides having cam followers at different axial positions thereon and each cooperating with a seclected cam groove in said cam plate.

2. In a machine tool, a carriage movable axially of the work, a plurality of tool slides movable transversely in said carriage toward and from the work, a cam plate fixed axially in said machine tool and having two bearing surfaces parallel to the path of movement of said carriage and having a plurality of separate cam grooves extending lengthwise of said plate, said carriage having a bearing member engaging one of said straight bearing surfaces and a second bearing member engaging the second straight bearing surface, and securing means for said second bearing member providing adjustment thereof toward and from said cam plate, and said tool slides having cam followers at different axial positions thereon and each cooperating with a selected cam groove in said cam plate.

3. In a machine tool, a carriage movable axially of the work, a plurality of tool slides movable transversely in said carriage toward and from the work in non-parallel relation, a templet bar having a plurality of cam surfaces lying substantially in a single plane and at different distances from the axis of the work, and cam followers on said tool slides, said followers being associated with different cam surfaces on said templet bar whereby said slides may be separately advanced toward the work.

In testimony whereof I have hereunto affixed my signature.

RICHARD A. ASHTON.